Aug. 8, 1961 R. A. PENDLETON 2,995,149

HIGH-SPEED ELECTRO-PNEUMATIC SWITCHING APPARATUS

Filed Jan. 28, 1957 3 Sheets-Sheet 1

INVENTOR:
Robert A. Pendleton,
BY Bair, Freeman & Molinare
ATTORNEYS.

INVENTOR:
Robert A. Pendleton,
BY Bair, Freeman & Molinare
ATTORNEYS.

HIGH-SPEED ELECTRO-PNEUMATIC SWITCHING APPARATUS

Filed Jan. 28, 1957 3 Sheets-Sheet 3

INVENTOR:
Robert A. Pendleton,
BY Bair, Freeman & Molinare
ATTORNEYS.

United States Patent Office 2,995,149

Patented Aug. 8, 1961

2,995,149

HIGH-SPEED ELECTRO-PNEUMATIC SWITCHING APPARATUS

Robert A. Pendleton, Dedham, Mass., assignor, by mesne assignments, to Minneapolis-Honeywell Regulator Company, a corporation of Delaware Filed Jan. 28, 1957, Ser. No. 636,601

20 Claims. (Cl. 137—608)

This invention relates generally to improvements in apparatus for controlling the movement of a flexible member and more particularly to a new and improved high speed valve apparatus for controlling the movement of an elongated tape such as a record tape having information stored therein.

In many present day data processing systems, and particularly those systems utilizing high speed machines such as electronic computers and the like, data is stored on magnetic record tape by the use of magnetized areas on the surface of the tape. The tape is driven past suitable information transfer heads, generally of the electromagnetic type, which are adapted to coöperate with a number of information tracks on the tape to effect reading or writing of information data.

The information stored on the tape generally is processed in the form of discrete groups of magnetic impulses, commonly called informational blocks, which may be called for by the associated data processing equipment either in the form of a continuous flow of blocks or only a single block at a time. Consequently, a flexible tape drive mechanism is required as the tape not only must be started and stopped at frequent intervals, but also must be capable of being driven in either a forward or reverse direction. Further, in such systems, the record tape is driven past the information transfer heads at high linear speeds. This serves to raise additional problems in fast starting or stopping of the tape in very short time intervals and in preventing tape deflection or skew from its normal path of travel during such fast starting and stopping.

Experience with tape handling machines of the prior art has shown that braking the capstan driving the tape is not satisfactory for high speed tape handling due to the inertia of the capstan. Accordingly, pneumatic mechanisms for controlling the movement of high speed tapes have been disclosed which are adapted to start and stop a record tape in a considerably reduced time and with a reduced amount of tape travel. One such system is described in my copending application Serial No. 586,209, filed May 21, 1956, now Pat. No. 2,866,637 in which a brake assembly is positioned between a pair of contra-rotating driving capstans each having suitable air communicating passages therein. The brake and the driving capstans are each pneumatic devices arranged with perforations at their tape engaging surfaces and with an air passage communicating therewith. The direction of tape travel and braking of the tape are controlled by providing selectively applied pneumatic pressure differentials for causing the tape to move into engagement with the surface of the brake or either of the driving capstans.

In my copending application identified above, the pneumatic pressure differentials are selectively applied to the brake and the capstans under the control of a pair of electromagnetically actuated poppet valve mechanisms.

It is a general object of this invention to provide a new control means for a pneumatically operated tape drive system.

More specifically it is an object of this invention to provide electro-pneumatically controlled valve apparatus for selectively switching pressure differentials to the drive capstans and the brake of a pneumatically operated tape drive system.

It is another object of this invention to provide improved control apparatus for starting and stopping a record tape in a very short time interval and with a minimum of tape travel.

It is still another object of this invention to provide improved control apparatus for starting and stopping a high speed record tape with a minimum of tape deflection or skew.

It is a further object of this invention to provide a new and improved valve apparatus for controlling a high speed record tape which is characterized by its speed of response and its efficiency of operation.

It is a still further object of this invention to provide an improved record tape controlling apparatus which is compact, fast acting and relatively simple in construction and operation.

In accordance with some of the features of a specific illustrative embodiment of this invention, the electro-pneumatically controlled valve apparatus comprises a valve housing having three bistable valve mechanisms adapted to switch pneumatic pressure differentials between the brake and the pair of contra-rotating drive capstans. Each valve mechanism comprises a flipper or control vane having a pair of blades and which is pivoted intermediate the blades such that when the flipper or vane is switched by a positive pressure from one to the other of its two stable states, it will remain in this position until a positive pressure is applied to the flipper to switch it back to its opposite stable state. Each flipper is adapted to fit into a recess in the valve body to cooperate with a pair of ports having resilient seats around their openings so that when the flipper is depressed in response to a positive pressure it engages one or the other of the resilient seats.

The position of each flipper is controlled by a pair of electromagnetic actuator relays mounted in a chamber which is filled with air at a relatively high positive pressure. Each actuator relay is normally biased so that its armature engages a resilient seat on a port operatively associated with one blade of the flipper. Thus when both actuator relays are in their de-energized states the high positive pressure in the actuator chamber is not transmitted through either port to the flipper. When one of the actuator relays is energized, its armature is moved away from the seat and the positive pressure in the actuator chamber passes through the port to depress its associated blade of the flipper to switch the latter from one stable state to the other. Although the actuator is energized only for a period of time sufficient to insure that the flipper has switched its position in the valve body, once the flipper has been switched it remains in the switched position even though the actuator relay is subsequently de-energized.

In accordance with an important feature of the invention, the locking of the flipper in one or the other of its two stable states is accomplished by the pressure differentials existing on the flipper when it is in one of its two stable states. When, for example, a first blade of the flipper is depressed to engage its seat, a subatmospheric pressure is applied through the port associated therewith to the other side of the depressed first blade. This subatmospheric pressure, in cooperation with the positive pressure on the opposite side of the first blade, serves to maintain the flipper in the one stable state.

When a positive pressure is applied to the second blade to switch the flipper to its other stable state, the second blade of the flipper engages its seat and the subatmospheric pressure applied through the port associated therewith serves to hold the flipper in its new stable state.

It is another feature of this invention that a positive pressure is permitted to be supplied to the line which communicates with the brake or capstan not engaging the tape for providing a positive pressure air cushion or air lubricating function for the tape. Still another feature of the invention is the provision of a positive pressure, when the switching operation takes place to release the tape from the capstans or from the brake, into the space leading to the capstan or brake to "blow off" the tape from the surface of the latter. This initially large blow off pressure then drops down to an intermediate value which is sufficient to provide the air bearing or air lubrication desired.

A still further feature of this invention is the provision of a biased spring covering a port in the valve cover which exhausts to atmosphere. This bias spring serves to produce a regulated intermediate pressure which pressure is between the positive pressure and the subatmospheric pressures supplied to the valve apparatus for carrying out the valve functions.

Another feature of the present invention lies in the novel electromagnetic control element which comprises an armature pivotally supported by a pair of resilient members mounted on opposite sides of the armature at displaced positions to bias said armature in a predetermined manner.

The above and other features of novelty which characterize the invention are pointed out with particularity in the claims appended to and forming a part of this specification. For a better understanding of this invention, however, its advantages and specific objects attained by its use, reference is had to the accompanying drawing and descriptive material in which is shown and described an illustrative embodiment of the invention.

Figures 1, 2, 3:
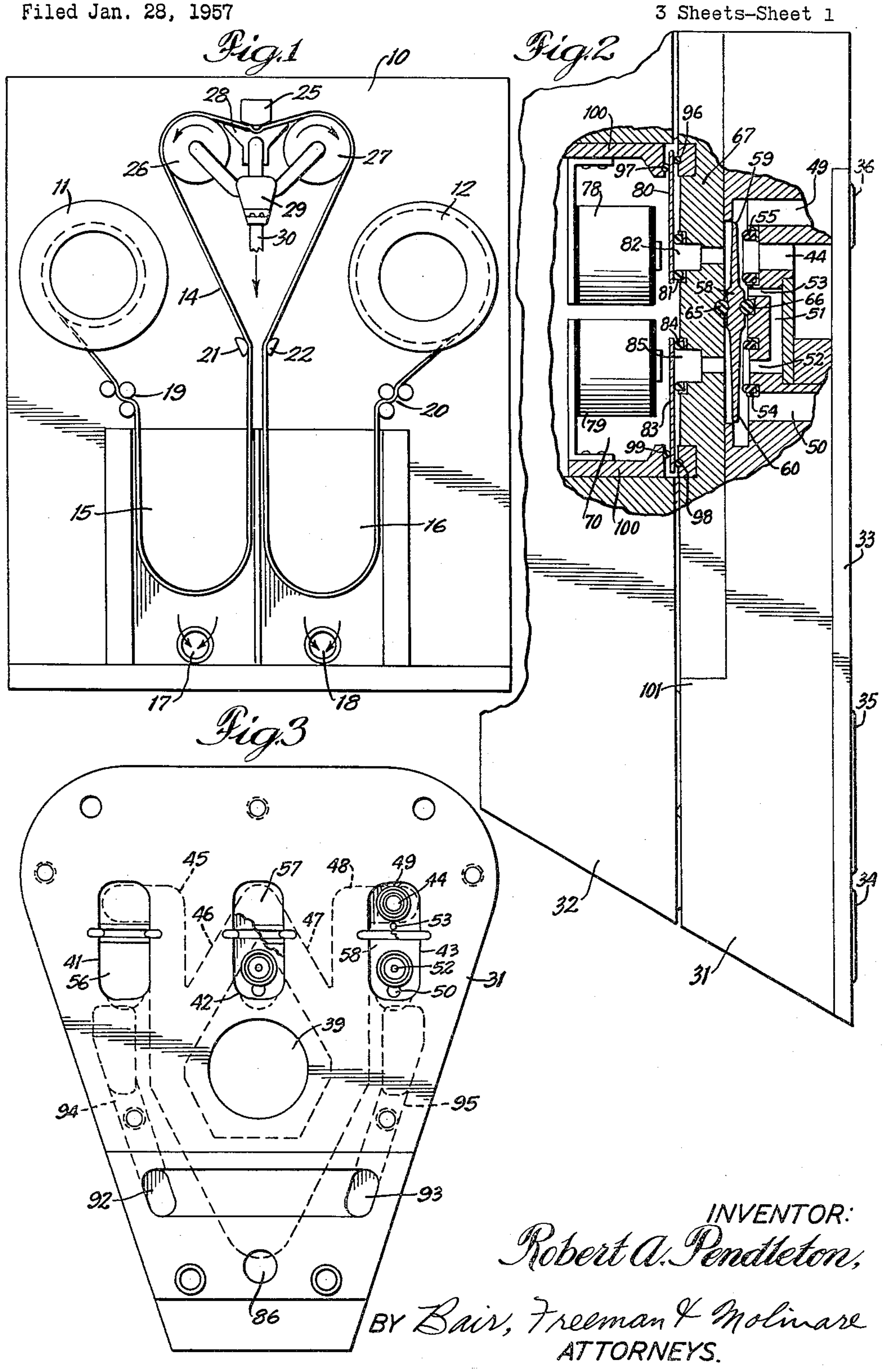
FIGURE 1 is a diagrammatic showing of a tape handling and transfer apparatus which embodies the present invention.
FIGURE 2 is a side view, partly in section, of the valve apparatus of FIGURE 1 showing one electro-pneumatically controlled flapper valve mechanism constructed in accordance with the invention.
FIGURE 3 is a front elevational view, partly in section, of the valve body shown in FIGURE 2.
Figure 4:
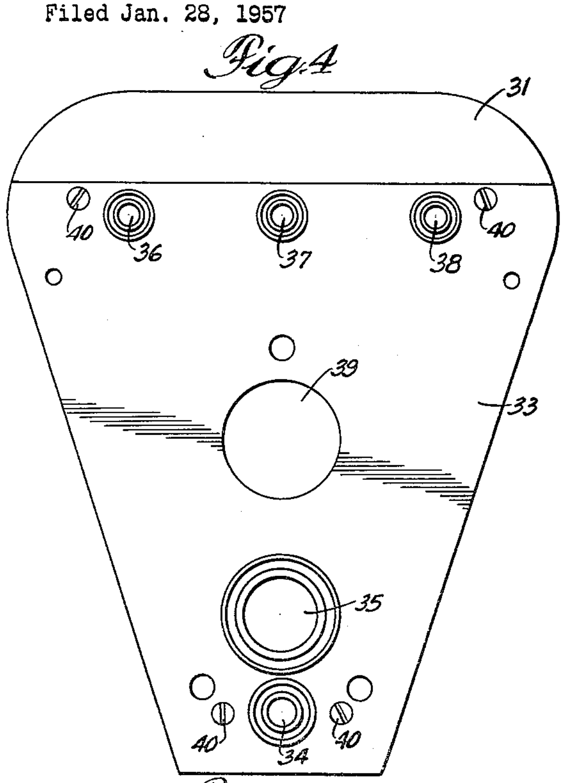
FIGURE 4 is a back elevational view of the valve body shown in FIGURE 2.

Referring now to the drawing and more particularly to FIGURE 1, the numeral 10 represents a panel or support upon which are mounted the elements used in the record tape handling apparatus shown. Carried by the support 10 are a pair of supply reels 11 and 12 which are arranged to be driven in either a forward or reverse direction by a suitable motor means, not shown. The reels 11 and 12 carry a tape 14 which may conveniently take the form of a magnetic tape upon which information may be stored by means of electrical impulses.

The tape 14 is arranged to pass through a pair of loop chambers 15 and 16. The loop chambers serve to maintain the tape 14 under tension due to the action of the atmospheric pressure exerted on top of the tape and an opposite reduced pressure present under the tape which is created by suitable suction means connected to outlet conduit means 17 and 18. The tape 14 is guided into the loop chambers 15 and 16 by suitable guide and tensioning pins 19 and 20, as well as by the guide pins 21 and 22. Guide pins 19 and 20, together with the force on the tape due to the pressure in the loop chamber, function to maintain the tape 14 under tension as it is wound onto the respective reels 11 or 12.

An informational transfer head 25 is positioned in engaging relation to the tape 14. The movement of the tape 14 past the transfer head 25 is accomplished by a pair of contra-rotating capstans 26 and 27 which advantageously are of the pneumatic type. The braking of the tape 14 with respect to the transfer head 25 is accomplished by the brake member 28, advantageously also of the pneumatic type. The preferred construction of the capstans 26 and 27, as well as the construction of brake 28, is explained in greater detail in my copending application identified above. The sudden application of a reduced pressure to the capstans 26 or 27 or the brake 28 is selectively controlled by a suitable electro-pneumatically controlled valve mechanism 29 adapted for selectively transferring a subatmospheric pressure from inlet 30 to the capstans 26 or 27 or the brake 28.

In considering the operation of the apparatus shown in FIGURE 1, it should first be noted that, whether for recording or reading purposes, the tape 14 must be transported past the information transfer head 25 at some predetermined speed which is suitable for producing a transfer of information between the head and the tape. Such a speed may be, for example, 100 inches per second and the diameter of the capstans and their speed of rotation are chosen so as to produce this linear surface speed.

The driving of the tape 14 past the head is accomplished by either one or the other of the driving capstans 26 and 27. As disclosed in my copending application identified above, the capstans 26 and 27 are provided with perforations at their tape engaging surfaces and when it is desired to drive the tape 14 from left to right past a reading head 25, the driving capstan 27 is actuated by the electro-pneumatic valve device 29 so that a subatmospheric pressure is applied to the perforations in capstan 27. This serves to draw the tape 14 into engagement with the capstan 27 to the end that the rotation of the capstan 27 is transferred to the tape and the latter is moved in the desired direction. When the tape 14 is to be moved in the opposite direction, the capstan 26 is actuated by the application of a subatmospheric pressure to its perforated surface by the electro-pneumatic valve device 29, and this causes the tape 14 to be drawn against the capstan 26 to the end that the tape is moved in the direction of rotation of capstan 26.

When it is desired to stop the movement of the tape 14, the electro-pneumatic valve device 29 is operated to disconnect the subatmospheric pressure from the capstan 26 or 27 driving the tape and to apply a subatmospheric pressure to the perforations in the surface of the brake member 28. The brake member in turn draws the tape 14 against the face of the brake and thereby causes the tape to stop.

The tape reels 11 and 12 are arranged to be driven by motor means, not shown, to maintain the tape 14 within loop chambers 15 and 16. The depth of the tape in the respective loop chambers advantageously may be detected by suitable photoelectric means or pressure sensing means which indicate how far the tape extends into the loop chamber. When the tape is being driven from left to right, the tape 14 tends to fill up the chamber 16. As the tape extends further into the chamber 16, the reel 12 will be operated to pull a suitable length of tape out of the chamber and onto the reel. Independently, the reel 11 will be driven to add a suitable length of tape to chamber 15 when the tape in the chamber rises above a predetermined level. The reels 11 and 12 function in the opposite manner when the tape is driven in the opposite direction by the driving capstan 26.

Turning now to the electro-pneumatic valve device 29 which is shown in greater detail in FIGURES 2 through 7 of the drawing, the valve basically is comprised of a valve body 31 and a valve cover 32. Valve body 31, which advantageously may be an integrally cast aluminum block, is adapted to support three flipper valve assemblies for switching subatmospheric pressures in a selective manner to capstans 26 or 27 or brake 28.

A valve body plate 33 is mounted on the rear face of valve body 31, by means of screws 40 or the like, and is formed with an inlet 34 for receiving air at a relatively high positive pressure which advantageously may be equal to 35 p.s.i. A second inlet 35 is provided in valve body plate 33 for receiving subatmospheric pressures which advantageously may be minus 5 p.s.i. Valve body plate 33 also is provided with three outlets 36, 37 and 38 which are adapted to be connected through suitable conduits to capstan 26, brake 28 and capstan 27, respectively. It will be appreciated that each of the inlets and outlets provided in valve body plate 33 will be made suitably airtight, to the end that the air pressures transmitted therethrough may be maintained with a minimum of loss. An aperture 39 also is provided in valve body plate 33 for receiving suitable electrical connectors as may be required for control of the actuator relays in the electro-pneumatic valve apparatus 29.

Figure 5:
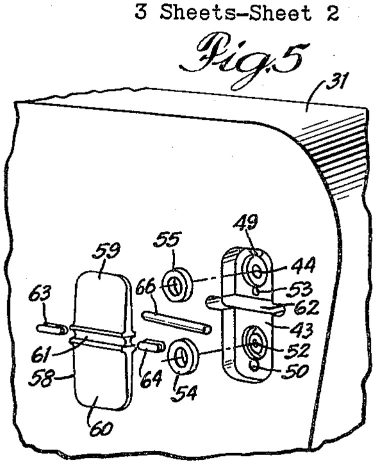
FIGURE 5 is an exploded view of a single flipper and flipper seat assembly constructed in accordance with the invention.
Figure 7:
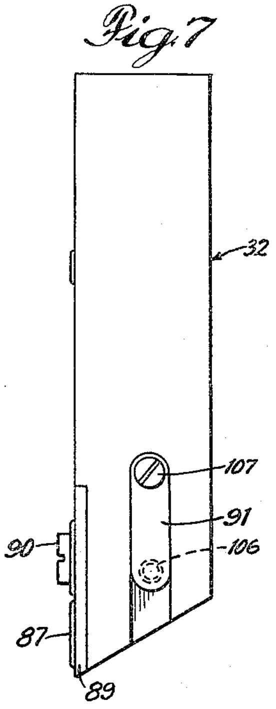
FIGURE 7 is a side elevational view of the valve cover shown in FIGURE 2.
Figure 6:
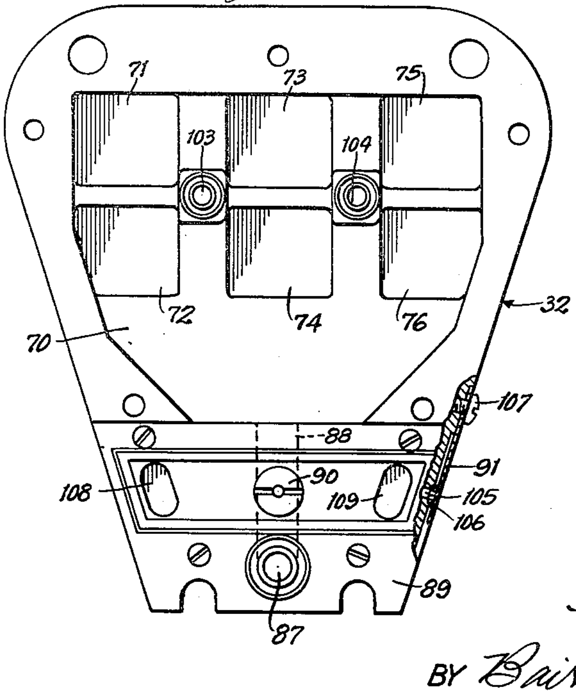
FIGURE 6 is a rear elevational view of the valve cover shown in FIGURE 2.

The front face of valve body 31 is formed with three aligned valve cavities 41, 42 and 43, each adapted to receive a suitable valving flipper. As shown in FIGURES 2, 3 and 5 of the drawing, each cavity has a port 44 in air passage communication with the inlet 35 through which the subatmospheric pressure of minus 5 p.s.i. is applied. This subatmospheric pressure is applied to each of the ports 44 by means of channels formed in the valve body 31. These channels, shown dotted in FIGURE 3, comprise channel 45 for transmitting subatmospheric pressure to the port 44 in cavity 41, channels 46 and 47 for transmitting subatmospheric pressure to the port 44 in cavity 42, and channel 48 for transmitting subatmospheric pressure to port 44 in cavity 43. Above the subatmospheric pressure port 44 in each cavity there is provided an outlet port 49 which communicates with the outlets 36, 37 or 38 associated with the respective cavities.

Formed below the subatmospheric port 44 in each cavity is a port 50 which is adapted to supply a pressure at an intermediate level, which advantageously may be approximately 1 p.s.i. to the flippers. This port 50 also serves as a passage to the intermediate pressure volume or space in which to exhaust the high pressure air expended in driving the flipper. A port 52 is provided above each port 50 and a port 53 is provided immediately below each port 44. A channel 51 is provided to link the ports 52 and 53 in each cavity by an air passage. Advantageously, a resilient seat 54 is located around each port 52 and resilient seat 55 is located around each port 44.

Each cavity has a flipper pivotally associated therewith—flipper 56 with cavity 41, flipper 57 with cavity 42, and flipper 58 with cavity 43. Each flipper, as for example flipper 58, is formed with a pair of tapered blades 59 and 60 which are separated by recesses 61 cut in the expanded central portion of the flipper. The flipper is arranged to be pivotally supported in the flipper seating plate by a resilient mounting which fits into the recesses 61 around the flipper and the recess 62 provided in the cavity. Advantageously this resilient mounting may comprise a pair of flipper side guides 63 and 64 and a pair of elongated resilient barrier strips 65 and 66. It will be understood that when the flipper 58 is mounted between the flipper seating plate and a spacer block 67, it is adapted to be pivoted into either of two stable states. In one of its stable states the upper blade 59 of the flipper engages seat 55 for sealing off its port 44 and in its other stable state the flipper is pivoted such that its lower blade 60 comes into engagement with seat 54 to seal off its port 52.

The flipper guide and barrier strips 63, 65 may well be formed of a single molded section. This section, in addition to acting as a support serves as a pressure seal between the two sides of the flipper.

The front face of valve body 31 is formed with a shoulder 101 adapted to receive the bottom edge of a spacer block 67. Spacer block 67 is formed with three pairs of vertically aligned apertures or ports extending through the spacer block. Each pair of apertures is provided to be operatively associated with one of the flippers 56, 57 or 58 such that when the relatively high positive pressure of 35 p.s.i. is passed through the upper aperture of each pair, the upper blade of its associated flipper is depressed against its seat and in a like manner, when the positive pressure is passed through the lower aperture of each pair, the lower blade of its associated flipper is depressed against its seat. The manner in which apertures 82 and 85 in spacer block 67 cooperates with blades 59 and 60, respectively, of flipper 58 is clearly shown in FIGURE 2 of the drawing.

A valve cover 32 is mounted so as to be held in position against spacer block 67 and valve body 31. As shown in greater detail in FIGURES 2 and 6, valve cover 32 comprises an upper chamber 70 adapted to house three pairs of actuator relays. The chamber 70 is arranged to receive a pair of actuator relays 78 and 79 in the positions 71 and 72, respectively, for operative association with flipper 58. Further, a pair of positions 73 and 74 are provided for a second pair of actuator relays for operative association with flipper 57 and another pair of positions 75 and 76 are provided for a third pair of actuator relays for operative association with flipper 56.

The armature of each actuator relay is normally biased over one of the apertures in spacer block 67 which serve to communicate the pressure in chamber 70 with one of the flippers in the valve body 31. Thus, for example, armature 80 of actuator relay 78 normally is held in engagement with a resilient seat 81 seated around one end of aperture 82 positioned between actuator relay 78 and blade 59 of flipper 58, and armature 83 of actuator relay 79 normally is held in engagement with a resilient seat 84 seated around one end of aperture 85 positioned between actuator relay 79 and lower blade 60 of flipper 58.

The relatively high positive pressure of 35 p.s.i. in the actuator relay chamber 70 is supplied from inlet 34 in valve body 31, through outlet 86 in valve body 31, inlet 87 in valve cover 32, and a channel 88 in valve cover 32 (shown in dotted lines in FIGURE 6) into chamber 70.

This high pressure of 35 p.s.i. also communicates with a secondary chamber, formed in valve cover 32 by valve cover plate 89, by means of a vent plug 90, which has a bleed port or orifice therein to provide a pressure drop for establishing the intermediate or lubricating air pressure.

At one side of the secondary chamber there is provided a bleeder or a relief valve in the form of a stiffened flat spring member 91. A port 105 extending through one side of valve cover 32 serves to communicate the pressure in the secondary chamber with the atmosphere. A resilient seat 106 is seated at the outside opening of port 105 and the relief valve spring member 91 is held over seat 106 by means of a screw 107. Advantageously, the tension of the relief valve spring member is adjusted such that the air pressure in the secondary chamber is maintained at an intermediate value, as for example, 1 p.s.i.

This intermediate pressure of 1 p.s.i. is applied from the secondary chamber in valve cover 32 to the valve body 31 by means of ports 108 and 109 in the former to ports 92 and 93 in the latter. Ports 92 and 93 communicate with the ports 50 in the flipper seating plates 41, 42 and 43 by means of suitable channels such as channels 94 and 95 shown in dotted line in FIGURE 3.

The operation of the electro-pneumatic valve 29 in switching subatmospheric pressures to the capstans 26 or 27 or the brake 28 now will be explained. Referring to FIGURE 2 it may be seen that the armature of each actuator relay is normally biased so as to be in engagement with the seat associated therewith. This bias is provided in accordance with an aspect of this invention by means of a pair of suitably displaced resilient members such as resilient members 96 and 97 supporting armature 80, and resilient members 98 and 99 supporting armature 83. The resilient biasing members of each pair are offset relative to each other such that the biasing member on the side of the armature adjacent the actuator relay is positioned closer to the relay than the biasing member positioned on the other side of the armature. It will be appreciated that this arrangement serves to maintain each armature normally depressed against its associated seat. Advantageously suitable depressions for holding the resilient biasing members are provided in the actuator relay support brackets 100 and the spacer block 67.

When an actuator relay is energized, as for example actuator relay 79, its armature 83 is pulled away from its seat 84 against the biasing force provided by resilient biasing members 98 and 99. This permits the positive pressure of 35 p.s.i. in the actuator chamber 70 to pass through aperture 85 in spacer block 67 onto the lower blade 60 of flipper 58. Consequently, blade 60 is depressed into engagement with its seat 54. Although the actuator relay 79 subsequently is de-energized, flipper 58 is locked in this stable position by the pressure differentials which now exist on the flipper. Thus, the subatmospheric pressure of minus 5 p.s.i. which is supplied through port 44 is applied through seat 55, port 53, linking channel 51 and port 52 to hold blade 60 of flipper 58 against its seat 54. This subatmsopheric pressure, cooperating with the intermediate pressure of 1 p.s.i. applied to the other side of blade 60 from port 50 serves to maintain flipper 58 in this stable state.

It will be appreciated that the actuator relay 79 need be energized only long enough to insure that flipper 58 has been switched from one stable state to the other in the valve body and that once the flipper is switched it will remain in that switched position due to the pressure differentials applied to the flipper even though actuator relay 79 is de-energized and its armature 83 returns to seating engagement with its seat 84. It also will be appreciated that when flipper 58 is in the stable position described above the subatmospheric pressure supplied through port 44 and seat 55 also exists in the supply line to capstan 26 through the upper port 49 and outlet 36.

If actuator 78 is energized to move its armature 80 from its seat 81, the positive pressure of 35 p.s.i. will be applied through the port 82 to cause the upper blade 59 of flipper 58 to engage its seat 55. When flipper 58 is in this stable state its upper blade 59 will be maintained in position against seat 55 by the subatmospheric pressure applied through port 44. Also in this state, the intermediate pressure applied through port 50 will pass through seat 54, port 52, channel 51 and port 53 and will bleed around the seat 55 of the upper port 44 to the supply line 49 to provide the capstan 26 connected therewith with a sufficient positive pressure for an air cushion or for supplying air lubricating pressure between the capstan and the tape.

It also is an aspect of this invention that when the switching operation of the flipper takes place, as described above, to release the tape from a capstan or from the brake, the positive pressure for switching the flipper is applied past the upper blade of the flipper and into the supply line leading to the capstan or brake so that there will be an initial large pressure applied to the capstan or brake to "blow off" the tape from its surface. The pressure then drops down to the intermediate pressure value after the actuator relay has been de-energized and will remain at this intermediate level to provide the air bearing or air lubrication desired.

It will be readily understood that the three flippers 56, 57 and 58 may be operated in any desired combination by means of their associated actuator relays to selectively apply a subatmospheric pressure to either of the driving capstans or to the brake, and to selectively blow off the tape from the capstan or brake with which the tape previously was engaged and to provide an air cushion therefor.

In an electro-pneumatic valve assembly constructed in accordance with the illustrative embodiment described above, it was found that the subatmospheric pressure could be switched to either capstan or to the brake such that the tape could be accelerated from a standstill to a full speed of 100 inches per second in 0.15 inch. It further was found that the tape could be stopped, after reading a block of information approximately 0.66 inch long, in a distance of 0.3 inch.

Figure 8:
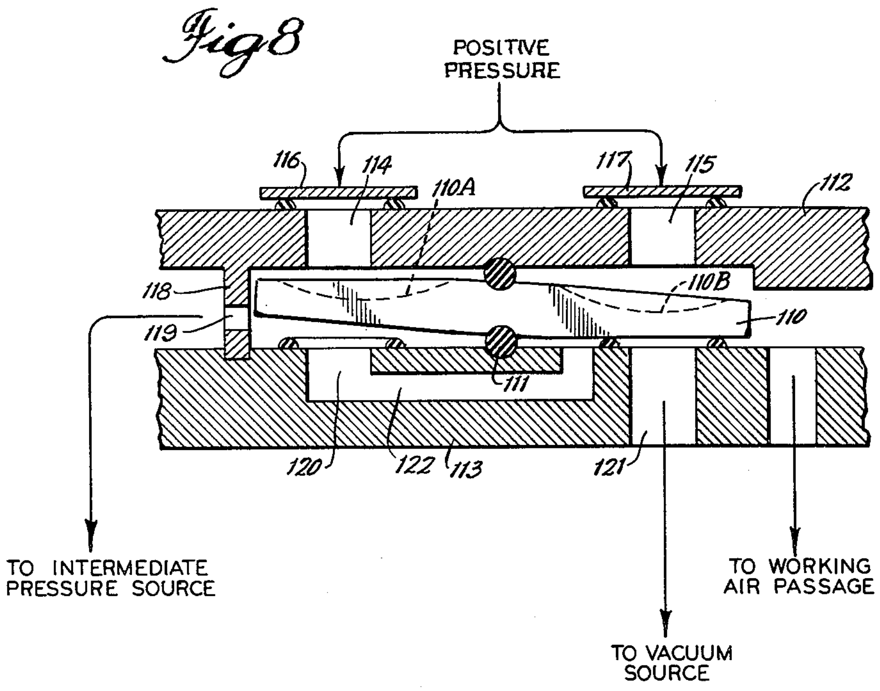
FIGURE 8 is a cross-sectional view of a modified form of the pneumatic switch.

FIGURE 8 shows a modified flipper member in a cavity having a modified end port with these modified elements cooperating to further increase the speed and efficiency of operation of the present pneumatic switch. The modified flipper and end port are shown in further detail in FIGURE 9, where the flipper is shown in plan view. In these figures, the numeral 110 identifies the flipper of the switch, the flipper having the upper surfaces milled out to form cylindrical pockets at 110A and 110B. The flipper 110 is supported by a resilient member 111 between the two plates 112 and 113, the latter of which may take the form of the plates 31 and 67 of FIGURE 2. The plate 112 has a pair of ports 114 and 115 extending therethrough with suitable armature members 116 and 117, respectively, normally maintaining the ports closed. The member or plate 112 has an extension at 118 with an opening or port 119 therein adjacent the left end of the flipper 110.

The flipper 110 is adapted to pneumatically switch a pair of ports 120 and 121 which correspond to the ports 44 and 52 of FIGURE 2. The port 120 communicates with the right side of the flipper 110 by way of the passage 122.

Basically, the operation of the switch of FIGURE 8 is the same as that of the switch described in connection with FIGURE 2. That is, the armature members 116 and 117 are selectively actuated and supply a positive pressure air blast to one side or the other of the flipper 110. This forces the flipper into one or the other of its two stable states. The flipper will then be locked in position by the pressure differentials existing across the flipper blade which is in the active position.

The presence of the cylindrical pockets 110A and 110B on the upper surface of the blades of the flipper 110 serve to momentarily trap the blast of positive air supplied by way of the ports 114 and 115. This entrapment of the air serves to provide an increased pressure acting on the flipper blade for a greater length of time to thereby increase the speed of the switching from one position to the other. This further permits the decreasing of the amount of time that the armature members 116 and 117 must be open to thereby decrease the positive air consumption of the device as well as the amount of equipment required to dispose of the positive air which has been dumped into the switch.

The extension 118, with the port 119, are arranged to cooperate with the left end of the flipper 110 so that when the flipper is being driven to the active position by the opening of the armature 116, the lower edge of the port 119, after the flipper has started to move, substantially cuts off the air flow from the intermediate pressure source into the port 120. Further, the vacuum from the port 121 is communicated through the passage 122 and port 120 to the lower edge of the flipper to effectively suck the flipper down against the seat surrounding the port 120. This further increases the pressure forces tending to move the flipper into the active position with respect to the port 120. This increase in the pressure forces further enhances the speed of the switching of the flipper from the position shown in the drawing to its opposite stable state.

Figure 9:
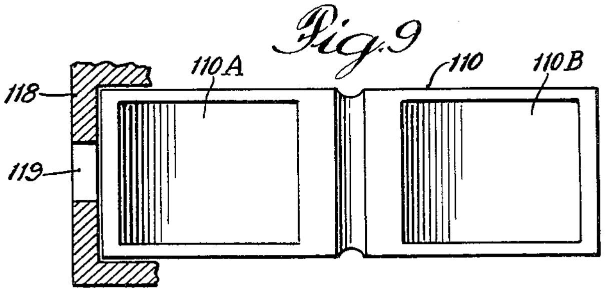
FIGURE 9 is a plan view of a portion of the apparatus illustrated in FIGURE 8.

As viewed in the plan view of FIGURE 9, it will be seen that the port 119 does not extend across the full end of the flipper 110. Further, the flipper 110 has square corners cooperating with the corners of the extension 118. This configuration tends to eliminate any tendency for the flipper to deflect into the port 119 during the switching operation.

It will be appreciated that the relatively high pressure of 35 p.s.i., the intermediate pressure of 1 p.s.i. and the subatmospheric pressure of minus 5 p.s.i. are pressures which have been found to work satisfactorily with the electro-pneumatic valve device 29 described above and that other combinations of pressures may be used with equally satisfactory results. It also will be understood by those skilled in the art that modifications may be made in the construction and arrangement of the parts of the above described control apparatus without departing from the real purpose and spirit of the invention and that it is intended to cover by the appended claims any modified forms of structures, circuits or use of equivalents which reasonably may be included within their scope.

What is claimed as the invention is:

1. A high speed valving apparatus which comprises a first inlet for receiving air at a pressure which is positive with respect to ambient, a second inlet for receiving air at a pressure which is negative with respect to ambient, a plurality of bistable elements, means for mounting each of said bistable elements in said valving apparatus such that each bistable element may be selectively positioned in either of two stable states, an outlet in said valving apparatus for each of said bistable elements, selectively actuatable means associated with each bistable element for directing the air at a positive pressure against the bistable element for switching it to one or the other of its two stable states and means for applying the air at the negative pressure to the bistable element to maintain it in its stable state until the next operaion of said selectively actuatable means, each oulet in said valving apparatus adapted to have the air at a negative pressure supplied thereto only when its bistable element is in a designated one of its two stable states.

2. A high speed valving apparatus in accordance with claim 1 wherein each of said bistable elements comprises a flipper member having opposed blade portions adapted to be operated by positive air pressures applied thereagainst.

3. A high speed valving apparatus in accordance with claim 2 wherein the selectively actuatable means associated with each bistable element comprises a pair of actuator relays, one for each blade portion of the bistable element flipper member, each of said actuator relays having an armature adapted in one position to block the positive air pressures from operating the blade portion and in the other position to enable the positive air pressure to be directed against the blade portion.

4. A high speed valving apparatus in accordance with claim 3 further comprising a spacer block positioned between each of said bistable elements and its selectively actuatable means, said spacer block being provided with an air passage between each actuator relay and a blade portion of its associated flipper member.

5. A high speed valving apparatus in accordance with claim 4 further comprising means for normally biasing the armature of each actuator relay in sealing relation against its associated air passage in said spacer block, said means comprising a pair of resilient members positioned in displaced relation against the opposite faces of said armature.

6. In combination, a high speed valving apparatus comprising a first inlet to said apparatus for receiving air at a pressure which is positive with respect to ambient, a second inlet to said apparatus for receiving air at a pressure which is negative with respect to ambient, first, second, and third bistable elements, means for mounting each of said bistable elements in the valving apparatus such that each bistable element may be selectively positioned in either of two stable states, a separate outlet in said valving apparatus associated with each of said bistable elements, selectively actuatable means associated with each bistable element for directing the air at a positive pressure against the bistable element for switching it to one or the other of its two stable states, and means for applying the air at the negative pressure to the bistable element to maintain it in its stable state until the next operation of said selectively actuatable means, each outlet in said valving apparatus being adapted to supply air at a negative pressure only when its associated bistable element is in a designated one of its two stable states.

7. The combination as defined in accordance with claim 6 further comprising means for producing air at a pressure intermediate said positive and negative pressures and for supplying the air to the outlets of said apparatus not supplied with the air at a negative pressure.

8. The combination as defined in accordance with claim 7 wherein said last named means comprises a resilient spring member biased against a port provided in a chamber to which the air at a positive pressure is applied and selectively operable means for adjusting the bias of the spring member against the port to produce a desired intermediate regulated pressure.

9. In combination, a high speed pneumatic valving apparatus comprising three bistable elements, means for mounting the bistable elements in said valving apparatus such that each bistable element may be selectively switched to either of two stable states, selectively actuatable means associated with each bistable element for causing it to be switched to one or the other of its two stable states, means for applying a subatmospheric pressure to each bistable element to maintain it in its stable state until the next operation of its associated selectively actuatable means, and three separate outlets in said valving apparatus each providing an air passage from separate ones of said bistable elements to respective ones of said outlets for supplying a subatmospheric pressure to the latter when the bistable element associated with the outlet is in the first one of its two stable states.

10. The combination as defined in accordance with claim 9 which further comprises means for supplying a positive pressure to each of said bistable elements, said positive pressure being supplied from each bistable element to its associated outlet only when the bistable element is in the second one of its two bistable states.

11. In a high speed valving apparatus of the type having air at a pressure which is positive with respect to ambient and air at a pressure which is negative with respect to ambient supplied thereto, the improvement of a bistable valve element having a pair of blade portions, a seating member for said bistable element, resilient means for pivotally mounting said bistable element in said seating member such that the bistable element may be positioned in either of two stable states, a first and second port associated with one blade portion of said bistable element and a third and fourth port associated with the other blade portion of said bistable element, means for supplying air at a negative pressure to said first port, means for supplying air at a positive pressure to said third port and a channel providing an air passage between said second and fourth ports whereby when said bistable element is positioned in one of its two stable states air at a negative pressure is applied to one blade portion to maintain the bistable element in its one stable state and air at the positive pressure is supplied to an outlet, and when said bistable element is in the other of its two stable states air at a negative pressure is applied to the other blade portion to maintain the bistable element in said other stable state and air at a negative pressure is applied to an outlet.

12. In a high speed valving apparatus of the type having air at a first pressure and air at a second pressure supplied thereto, the improvement of a bistable valve element having first and second blade portions, means for seating said bistable valve element in said valving apparatus such that the bistable element may be positioned in either of two stable states, an outlet, a first and second port associated with said first blade portion and a third and fourth port associated with the said second blade portion, means for supplying air at said second pressure to said first port, means for supplying air at said first pressure to said third port and a channel providing an air passage between said second and fourth ports whereby when said bistable element is positioned in one of its two stable states air at said second pressure is applied to said first blade portion to maintain the bistable element in position and air at said first pressure is supplied to said outlet, and when said bistable element is in the other of its two stable states air at said second pressure is applied to said second blade portion and to said outlet.

13. A high speed valving apparatus comprising the improvement of a bistable valve element having a pair of blade portions, means for seating said bistable valve element in said valving apparatus such that the bistable element may be positioned in either of two stable states, a first and second port associated with one blade portion of said bistable element, a third and fourth port associated with the other blade portion of said bistable element, a channel providing an air passage between said second and fourth ports, and means for applying differential pressures to said first and third ports whereby when said bistable element is positioned in one of its two stable states a relatively high pressure is supplied to an outlet in said valving apparatus and when said bistable element is in the other of its two stable states a relatively low pressure is applied to said outlet.

14. A high speed valving apparatus comprising in combination a valve body, a first inlet in said valve body for receiving air at a pressure that is positive with respect to ambient, a second inlet in said valve body for receiving air at a pressure which is negative with respect to ambient, a plurality of bistable elements, each of said elements having a pair of opposed blades, resilient means for pivotally mounting said bistable elements in the valve body such that each bistable element may be positioned in either of its stable states, an outlet in said valve body for each of said bistable elements, a plurality of ports associated with each bistable element, means for communicating air at a negative pressure to a first one of said ports, means for communicating air at a pressure intermediate said positive and negative pressures to a second one of said ports, a third port positioned adjacent said first one of said ports, a fourth port positioned adjacent said second one of said ports, a channel providing an air passage between said third and fourth ports, said first and third ports being operatively associated with one of the blades of said bistable element and said second and fourth ports being operatively associated with the other blade of said bistable element, a valve cover, a chamber in said valve cover in air communication with said first inlet in said valve body whereby said chamber is supplied with air at said positive pressure, selectively actuatable means in said chamber associated with each of said bistable elements, said selectively actuatable means being adapted for positioning its bistable element in either one of its two stable states and comprising a pair of actuator relays, each including an armature, a spacer block having a pair of apertures for each bistable element positioned between said valve body and said valve cover, resilient means normally biasing each armature over one of said apertures to seal said positive air pressure within said chamber whereby the energization of one of each pair of actuator relays causes its armature to be moved away from its associated aperture to permit the positive air pressure within the chamber to pass through the aperture and depress one blade of the bistable element against said first port, said bistable element being maintained in this stable state by the negative pressure applied to the other face of said blade, and the energization of the other of said pair of actuator relays causes its armature to be moved away from the other aperture to permit the positive air pressure in said chamber to depress the other blade of said bistable element against the second port whereby the negative air pressure is applied to said first port and to the outlet associated with said bistable element.

15. A pneumatic bistable switch comprising a single elongated valving member having a pair of planar surfaces, means pivoting said member at the central portion thereof between said surfaces, first pneumatic means positioned to actuate said member to one or the other of two valving positions by transmitting a pneumatic pressure to one or the other of said planar surfaces, and second pneumatic means positioned to be controlled directly by said valving member and to communicate when switched by said valving member and a latching pressure to said valving member in one or the other of its two valving positions.

16. A bistable pneumatic switch comprising a flat elongated member, means supporting said member so that said member may be pivoted into one or the other of its bistable states, a pair of pressure communicating ports adjacent opposite ends of said member and adapted to have a positive air pressure selectively passed therethrough against said member to drive said member to a desired one of its two stable states, and a pair of air entrapping pockets formed in the opposite end portions of said member adjacent to said ports to enhance the driving forces produced by the passing of positive air pressure through said ports.

17. A bistable pneumatic switch as described in claim 16 wherein a subatmospheric pressure port is adapted to communicate a subatmospheric pressure to at least one side of said member opposite one of the air entrapping pockets to enhance the speed of switching said member from one bistable state to the other.

18. An actuator for an electromagnetic apparatus comprising an electromagnet, a movable armature positioned adjacent said magnet and adapted to be moved thereby, and pivoting means carrying said armature and biasing said armature to a predetermined position, said pivoting means comprising a pair of non-metallic resilient members positioned on opposite sides of said armature, and displaced with respect to each other to act along two displaced parallel lines, and means exerting a compressive force on both of said resilient members to retain said armature and resilient members in position and cause said resilient members to bias said armature to said predetermined positioned so that said armature has no metal bearing points associated with the pivoting thereof.

19. In combination, in a controller for effecting a predetermined control action, an actuator, a movable member positioned at a first predetermined location adjacent said actuator and adapted to be moved by said actuator between a first position wherein said control action is effected and a second position, a movable member supporting means including means supporting said actuator and having a pair of adjacent facing surfaces, at least one of said facing surfaces having a linear recess therein, and a pair of elongated non-metallic resilient members being positioned on opposite sides of said movable member between said facing surfaces at a location displaced from said first location where said movable member is adjacent said actuator and with one of said resilient members being positioned in said recess to retain said movable member in position with respect to said supporting means, said resilient members forming a pivot for said movable member along an axis parallel to said recess.

20. In combination, in a controller for effecting a predetermined control action, an actuator, a movable member positioned adjacent said actuator at a first predetermined location and being moved by said actuator between a first position wherein said control action is effected and a second position, supporting means including means supporting said actuators and having a pair of adjacent facing surfaces, and non-metallic resilient means being positioned on opposite sides of said movable member and between said pair of surfaces and at a location displaced from said first location to retain said movable member in position with respect to said supporting means, said resilient means forming a pivot for said movable member.

References Cited in the file of this patent

UNITED STATES PATENTS

| | | |
|---|---|---|
| 835,918 | Sabroe | Nov. 13, 1906 |
| 1,613,897 | Lichty et al. | Jan. 11, 1927 |
| 2,511,844 | Grove | June 20, 1950 |
| 2,608,405 | Salfisberg et al. | Aug. 26, 1952 |
| 2,735,968 | Bogue et al. | Feb. 21, 1956 |
| 2,738,948 | Barnes | Mar. 20, 1956 |
| 2,778,634 | Gams | Jan. 22, 1957 |
| 2,786,163 | Vigren et al. | Mar. 19, 1957 |
| 2,786,673 | Bridenstine | Mar. 26, 1957 |
| 2,792,217 | Weidenhammer et al. | May 14, 1957 |
| 2,837,330 | Lawrance et al. | June 3, 1958 |
| 2,866,637 | Pendleton | Dec. 30, 1958 |